(12) United States Patent
Kim et al.

(10) Patent No.: US 7,443,559 B2
(45) Date of Patent: Oct. 28, 2008

(54) OPTICAL SCANNING UNIT

(75) Inventors: Hyung-soo Kim, Suwon-si (KR); Hyeong-chae Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 944 days.

(21) Appl. No.: 10/984,779

(22) Filed: Nov. 10, 2004

(65) Prior Publication Data

US 2005/0134680 A1 Jun. 23, 2005

(30) Foreign Application Priority Data

Dec. 5, 2003 (KR) .................... 10-2003-0087986

(51) Int. Cl.
*G02B 26/08* (2006.01)
(52) U.S. Cl. .................................................. 359/206
(58) Field of Classification Search ......... 359/205–207, 359/216–218; 347/256
See application file for complete search history.

(56) References Cited

U.S. PATENT DOCUMENTS 5,808,773 A 9/1998 Ono ........................... 359/205
6,069,724 A * 5/2000 Hayashi et al. ............. 359/206

FOREIGN PATENT DOCUMENTS

| JP | 63-80218 | 4/1988 |
|---|---|---|
| JP | 02-171715 | 7/1990 |
| JP | 10-003051 | 1/1998 |
| JP | 2001-142019 | 5/2001 |

\* cited by examiner

*Primary Examiner*—Euncha P Cherry
(74) *Attorney, Agent, or Firm*—Staas & Halsey LLP (57) ABSTRACT

An optical scanning unit including: a light source which produces and emits a beam; a beam deflector which deflects and scans the beam in a main scanning direction of an exposed object; and an f-θ lens which corrects the beam deflected by the beam deflector at different magnifications for the main scanning direction than for a subscanning direction so that a corrected beam is focused onto the exposed object. When H is an entire length in the main scanning direction of the beam focused onto the exposed object and L is an axial distance between a reflection face of the beam deflector and the exposed object, the relationship of H and L satisfies an expression $$0.25 \leq \frac{H}{2 \cdot L} \leq 1.75.$$

18 Claims, 5 Drawing Sheets

OPTICAL SCANNING UNIT

CROSS-REFERENCE TO RELATED APPLICATION

This application claims the priority of Korean Patent Application No. 2003-87986, filed on Dec. 5, 2003, in the Korean Intellectual Property Office, the disclosure of which is incorporated herein by reference.

BACKGROUND OF THE INVENTION

1. Field of the Invention

The present invention relates to an optical scanning unit that scans a beam emitted by a light source onto an exposed object, and more particularly, to an optical scanning unit designed to provide sufficient optical path length between a beam deflector and an exposed object to ease installation of an f-θ lens or f-θ lenses and stable optical performance.

2. Description of Related Art

Typically, an optical scanning unit is employed in a laser printer, a digital copier, a facsimile, or the like to produce a latent image on an exposed object through main scanning by a beam deflector and subscanning by rotation of the exposed object.

Figure 1:
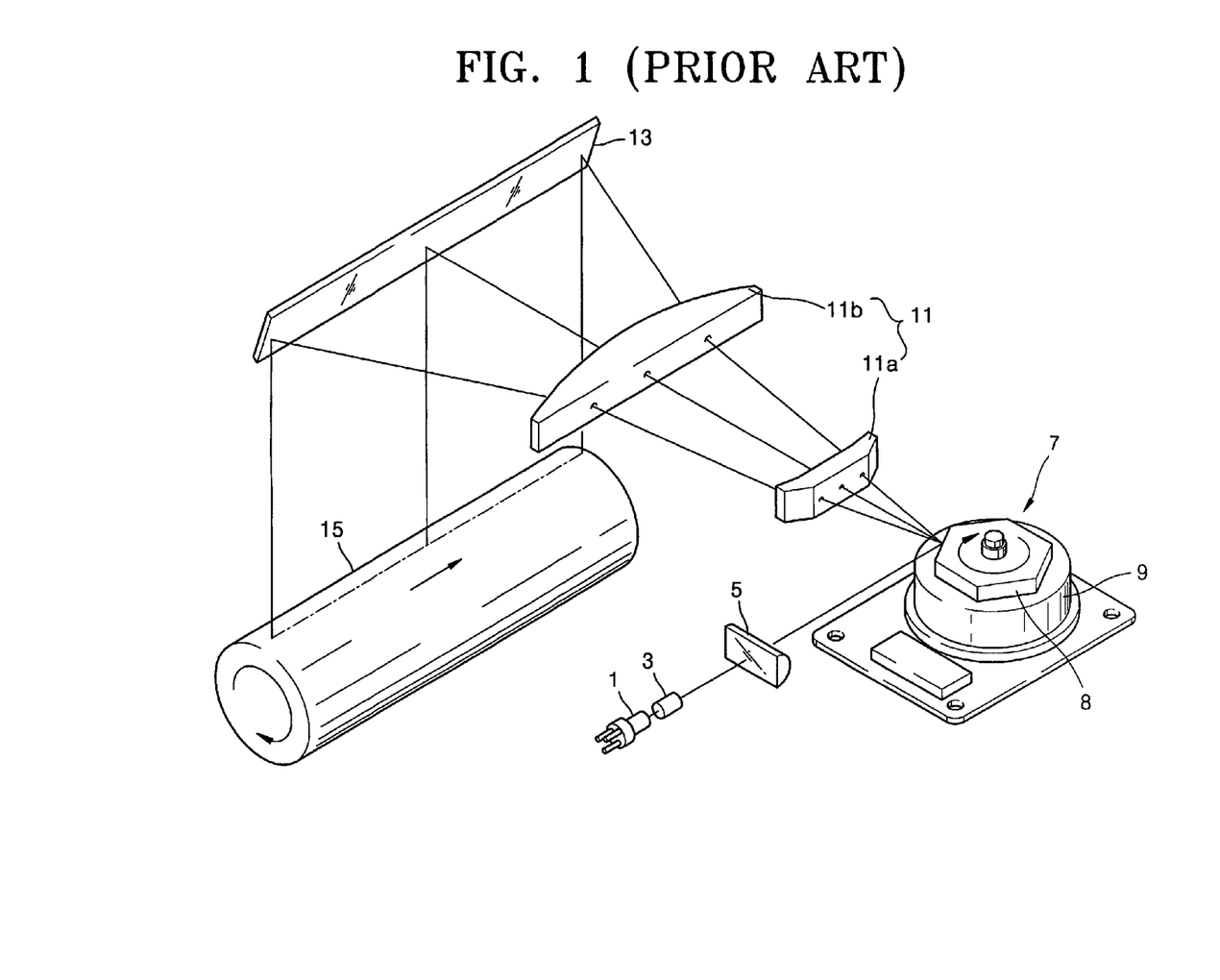
FIG. 1 is a schematic perspective view showing the optical arrangement of a conventional optical scanning unit.

Referring to FIG. 1, a conventional optical scanning unit includes a light source 1 that produces and emits a beam, a beam deflector 7 that deflects the beam emitted by the light source 1 to be scanned onto an exposed object 15 in the main scanning direction, an f-θ lens 11 that corrects an error contained in the beam deflected by the beam deflector 7. In addition, a collimating lens 3 that collects the divergent beam from the light source 1 and a cylindrical lens 5 that shapes the beam are located in an optical path between the light source 1 and the beam deflector 7, and a mirror member 13 that changes the direction of the scanned beam is disposed between the f-θ lens 11 and the exposed object 15.

The beam deflector 7 includes a driving source 9 and a rotating polygonal mirror 8 rotated by the driving source 9. The direction in which a beam emitted by the light source 1 is scanned is determined according to the reflection direction of a beam that changes as the rotating polygonal mirror 8 rotates.

The f-θ lens 11 includes respective first and second lenses 11a and 11b. First lens 11a compensates for astigmatism present in the beam deflected by the beam deflector 7. Second lens 11b focuses the scanned beam and corrects the beam so that scanning lines are equiangular and equally spaced.

The optical scanning unit configured above has to provide a sufficient optical path between the beam deflector 7 and the exposed object 15 since a beam deflected by the beam deflector 7 is incident onto the entire main scanning area of the exposed object 15. Furthermore, the optical scanning unit requires the f-θ lens 11 that is easy to manufacture and to achieve stable optical performance.

When the optical scanning unit is used in image producing equipment using four exposed objects such as a color laser printer, it is necessary to scan a beam on each object. To simplify the construction of the optical scanning unit while satisfying this requirement, the optical scanning unit must be designed to scan four beams using a single beam deflector. When the optical scanning unit having a single beam deflector scans multiple beams, an optical path length between the beam deflector and the exposed object is too small to allow optical arrangement of four group f-θ lenses.

BRIEF SUMMARY

An embodiment of the present invention provides an optical scanning unit employing an f-θ lens with a low magnification of focusing in subscanning direction and which is able to provide a long optical path between a beam deflector and an exposed object as well as stable optical performance and facilitate ease of fabrication.

According to an aspect of the present invention, there is provided an optical scanning unit including: a light source which produces and emits a beam; a beam deflector which deflects and scans the beam in a main scanning direction of an exposed object; and an f-θ lens which corrects the beam deflected by the beam deflector at different magnifications for the main scanning direction than for the subscanning direction so that a corrected beam is focused onto the exposed object. When H is an entire length in the main scanning direction of the beam focused onto the exposed object and L is an axial distance between a reflection face of the beam deflector and the exposed object, the relationship of H and L satisfies an expression $$0.25 \leq \frac{H}{2 \cdot L} \leq 1.75.$$

According to another aspect of the present invention, there is provided an optical scanning unit, including a light source module which emits a plurality of beams, each of which is independently optically modulatable; an optical path changing unit which changes propagation paths of the plurality of beams so that a plurality of changed beams are directed toward a plurality of exposed objects, respectively; and a plurality of f-θ lenses which correct the plurality of changed beams and have traveled along different optical paths at different magnifications in the main scanning direction than in the subscanning direction so that corrected beams are focused onto the plurality of exposed objects. When H is an entire length in the main scanning direction of the beam focused onto the exposed object and L is an axial distance between a reflection face of the beam deflector and the exposed object, a relationship of H and L satisfies an expression $$0.25 \leq \frac{H}{2 \cdot L} \leq 1.75.$$

According to another aspect of the present invention, there is provided a method of arranging optical components in an optical scanning device, including: providing a light source which emits a beam, a beam deflector which deflects the beam so that the beam scans in a main scanning direction of an exposed object; and an f-θ lens which corrects the beam deflected by the beam deflector so that a corrected beam is focused onto the exposed object, the correcting being at different magnifications for the main scanning direction than for the subscanning direction; and setting a distance between the beam deflector and the exposed object so that the following expression is satisfied $$0.25 \leq \frac{H}{2 \cdot L} \leq 1.75.$$

H is an entire length in the main scanning direction of the beam focused onto the exposed object and L is an axial distance between a reflection face of the beam deflector and the exposed object.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
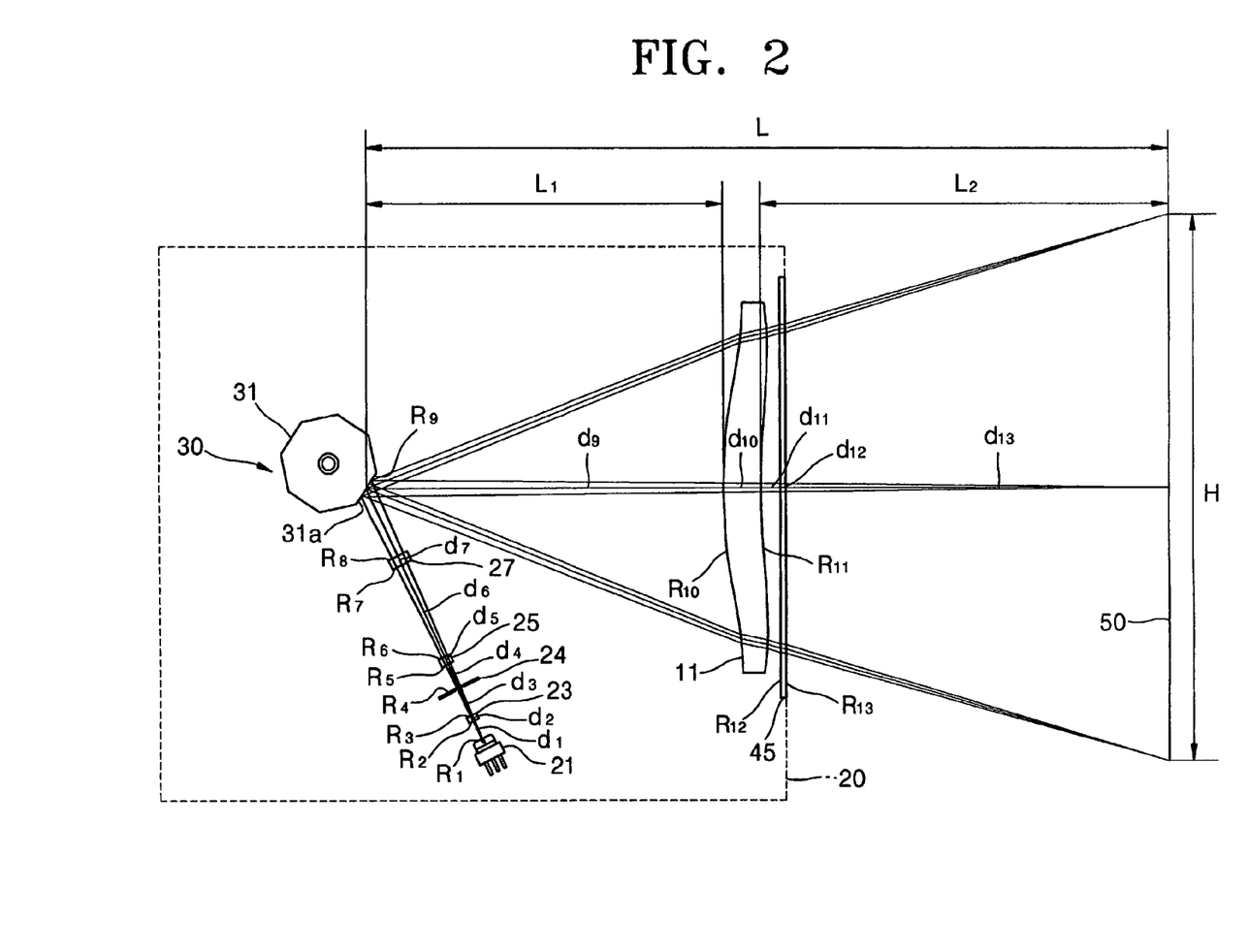
FIG. 2 is a top view showing the optical arrangement of an optical scanning unit according to an embodiment of the present invention.
Figure 3:
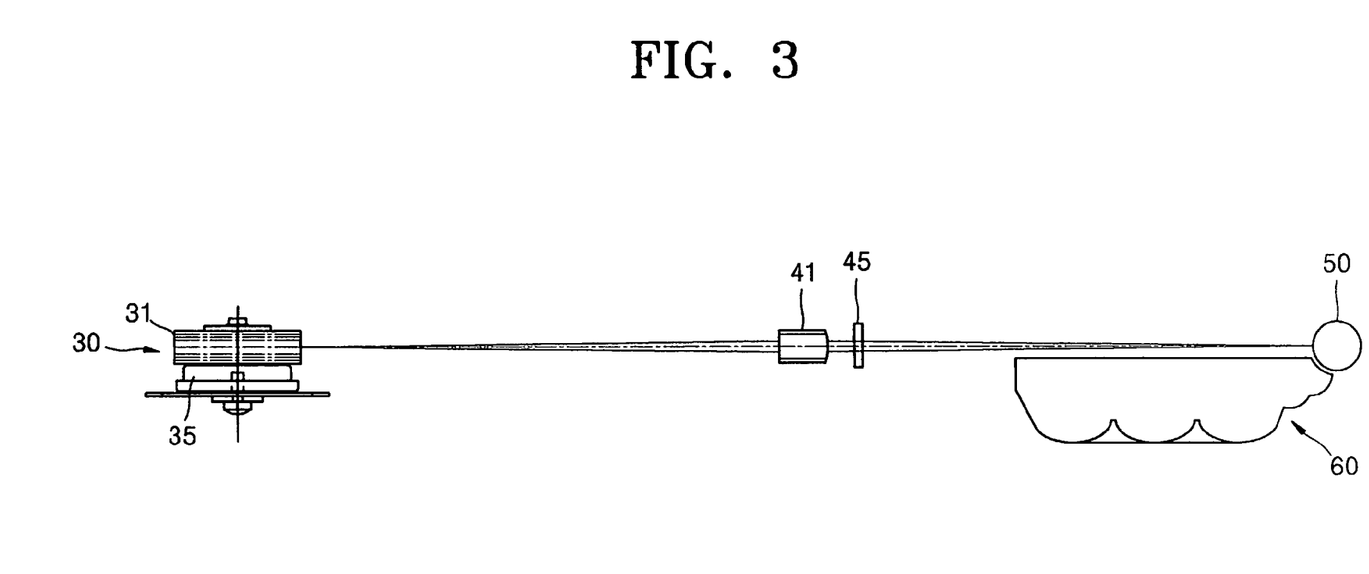
FIG. 3 is a side view showing a portion of the optical scanning unit of FIG. 2.

Referring to FIGS. 2 and 3, an optical scanning unit according to an embodiment of the present invention includes a light source 21 that produces a beam, a beam deflector 30 that deflects and scans the beam emitted by the light source 21, and an f-θ lens 41. The light source 21 optically modulates the beam such that the beam is emitted only onto a portion of the exposed object 50 on which a latent image will be formed. The light source 21 may be constructed as an edge emitting laser diode, a vertical cavity surface emitting laser (VCSEL), or a light-emitting diode (LED). When used for an optical scanning unit structure designed to produce a single scanning line as shown in FIG. 3, the light source 21 is configured to produce and emit a single beam.

Figure 5:
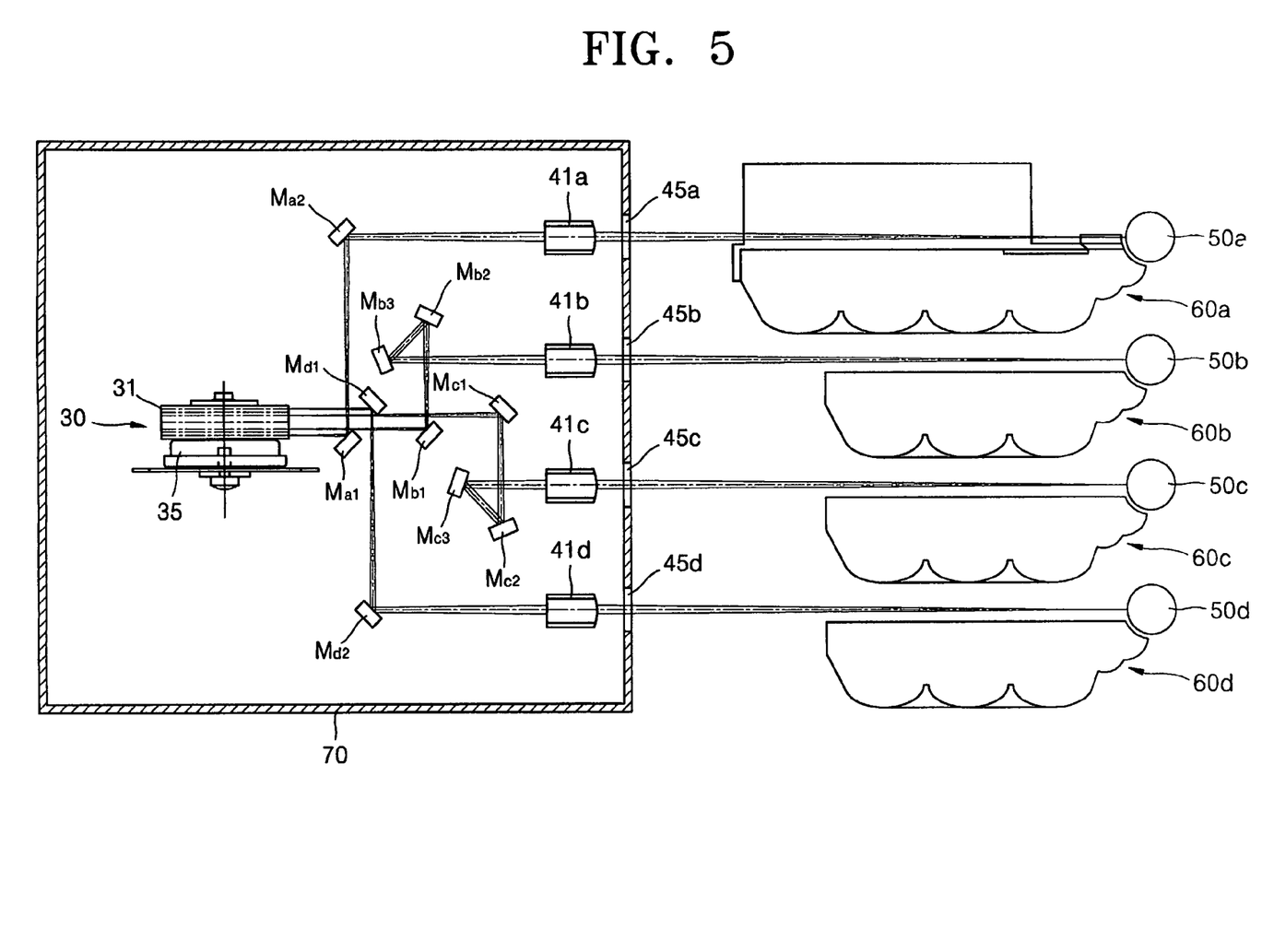
FIG. 5 is a side view showing the optical arrangement of an optical scanning unit according to another embodiment of the present invention.

On the other hand, when used for an optical scanning unit designed to scan multiple beams as shown in FIG. 5, a light source module is used to emit the multiple beams, for example, four beams (in the case of producing scanning lines simultaneously for four exposed objects), each of which are optically modulated independently. Since constructions of the light source 21 and the light source module are known in the art, a detailed explanation thereof will not be given.

The optical scanning unit further includes a collimating lens 23, an aperture stop 24, and respective first and second cylindrical lenses 25 and 27 in an optical path between the light source 21 and the beam deflector 30. The collimating lens 23 collimates the divergent beam emitted by the light source 21 into a parallel or convergent beam. While the first cylindrical lens 25 focuses a beam passing through the aperture stop 24 in subscanning direction onto the beam deflector 30, the second cylindrical lens 27 focuses an incident beam in main scanning direction. The second cylindrical lens 27 not only decreases the distance between the light source 21 and the beam deflector 30 but also minimizes a change in the entire focal length of the optical scanning unit with respect to a change in temperature. Here, the subscanning direction refers to the direction that the exposed object 50 rotates, and the main scanning direction refers to an axial direction of the exposed object 50, i.e., the direction in which the beam is deflected by the beam deflector 30.

Table 1 (to be described later) shows data relating to the respective first and second cylindrical lenses 25 and 27 when they are made from glass and plastic materials, respectively, and both may be made from plastic material to realize the reduced manufacturing costs while facilitating high volume production or glass material to reduce a change in optical performance as the temperature varies. Otherwise, the first and second cylindrical lenses 25 and 27 may be made of plastic and glass materials, respectively.

The beam deflector 30 deflects and scans a beam that has been emitted by the light source 21 in the main scanning direction of the exposed object 50. The beam deflector 30 includes a driving source 35 and a rotating polygonal mirror 31 moved by the driving source 35 in a clockwise or a counterclockwise direction. The rotating polygonal mirror 31 has a plurality of reflecting surfaces 31a on its sidewalls. When the rotating polygonal mirror 31 rotates, the angle of the reflecting surface 31a with respect to an incident beam changes, so that the incident beam is scanned in the main scanning direction. The structure of the beam deflector 30 is not limited to the rotating polygonal mirror structure as shown in FIGS. 2 and 3. For example, the beam deflector 30 may be configured with a hologram disc that diffracts and deflects the incident beam.

The f-θ lens 41 corrects the beam deflected by the beam deflector 30 at different magnifications for main scanning direction and subscanning direction so that the beam is focused onto the exposed object 50. Here, the magnification of focusing in the subscanning direction is made low to achieve optical performance comparable to that achieved by the optical scanning unit of FIG. 5. The f-θ lens 41 is comprised of a single aspheric lens having different radii of curvature in the main scanning direction and the subscanning direction. The f-θ lens 41 is made from a plastic material. As is evident by FIG. 2, both surfaces of the f-θ lens 41 with radii $R_{10}$ and $R_{11}$ of curvature have small aspheric departures. That is, the f-θ lens 41 is designed to have a low magnification of focusing in the subscanning direction, thereby minimizing an aspheric departure, and is made of plastic material that makes mold design manufacture and injection process easy.

All of the optical elements of the optical scanning unit are included within a housing 20. A cover 45 made of transparent material, from which the beam passing through the f-θ lens 41 emerges, is disposed in the housing 20 and protects the internal components. The exposed object 50 is a medium exhibiting the difference (e.g., potential difference) between portions onto which a beam is focused and non-focused. The exposed object 50 may be a photoreceptor drum or belt.

FIG. 3 shows an example of using a photoreceptor drum as the exposed object 50. Referring to FIG. 3, the photoreceptor drum in a developing device 60 is charged to a specified potential by a charging device (not shown). When the potential drops at a portion where a beam spot is formed by the optical scanning unit, a latent electrostatic image is produced and then developed with toner. Thus, the image is formed on the photoreceptor drum.

Table 1 shows the design specification of an optical scanning unit according to an embodiment of the present invention configured as shown in FIGS. 2 and 3.

TABLE 1

| Radius [mm] | Thickness (distance) [mm] | Component (material) |
|---|---|---|
| $R_1 = \infty$ | $d_1 = 9.9$ | Light source |
| $R_2 = 6.364$ | $d_2 = 2.0$ | Collimating lens |
| $R_3 =$ aspheric | $d_3 = 5.0$ | (glass) |
| $R_4 = \infty$ | $d_4 = 5.0$ | Aperture stop |
| $R_5 =$ cylindrical | $d_5 = 3.0$ | First cylindrical lens |
| $R_6 = \infty$ | $d_6 = 50.7$ | (glass) |
| $R_7 =$ cylindrical | $d_7 = 3.0$ | Second cylindrical lens |
| $R_8 = \infty$ | $d_8 = 30.0$ | (plastic) |
| $R_9 = \infty$ | $d_9 = 145.0$ | Reflecting surface of rotating polygonal mirror |
| $R_{10} =$ aspheric | $d_{10} = 15.0$ | f-θ lens (plastic) |
| $R_{11} =$ aspheric | $d_{11} = 8.0$ | |
| $R_{12} = \infty$ | $d_{12} = 1.9$ | Cover (glass) |
| $R_{13} = \infty$ | $d_{13} = 155.0$ | |

When the optical scanning unit has the optical arrangement as shown in Table 1, $L_1$=145 mm, $L_2$=155 mm, L=324.9 mm, and H=216 mm. Here, $L_1$ is an axial distance between the reflection face of the beam deflector 30 and the entrance face ($R_{10}$) of the f-θ lens 41, $L_2$ is an axial distance between the exit face of the f-θ lens 41 and the exposed object 50, L is an axial distance between the reflection face of the beam deflector 30 and the exposed object 50, and H is an entire length in main scanning direction of a beam focused onto the exposed object 50.

To facilitate ease of fabrication and achieve stable optical performance in the optical scanning unit of the present embodiment, the relationship of L and H satisfies the requirement of Inequality (1):

$$0.25 \leq \frac{H}{2 \cdot L} \leq 1.75 \quad (1)$$

And, the relationship of $L_1$ and $L_2$ may satisfy the requirement of Inequality (2):

$$0.5 \leq \frac{L_2}{L_1} \leq 1.5 \quad (2)$$

By setting the distance between the beam deflector 30 and the exposed object 50 that satisfies the requirements specified by Inequalities (1) and (2), it is possible to provide a sufficient optical path length between them, thus allowing flexibility in changing an optical path. Furthermore, it is easy to install optical components including the f-θ lens 41.

Figure 4:
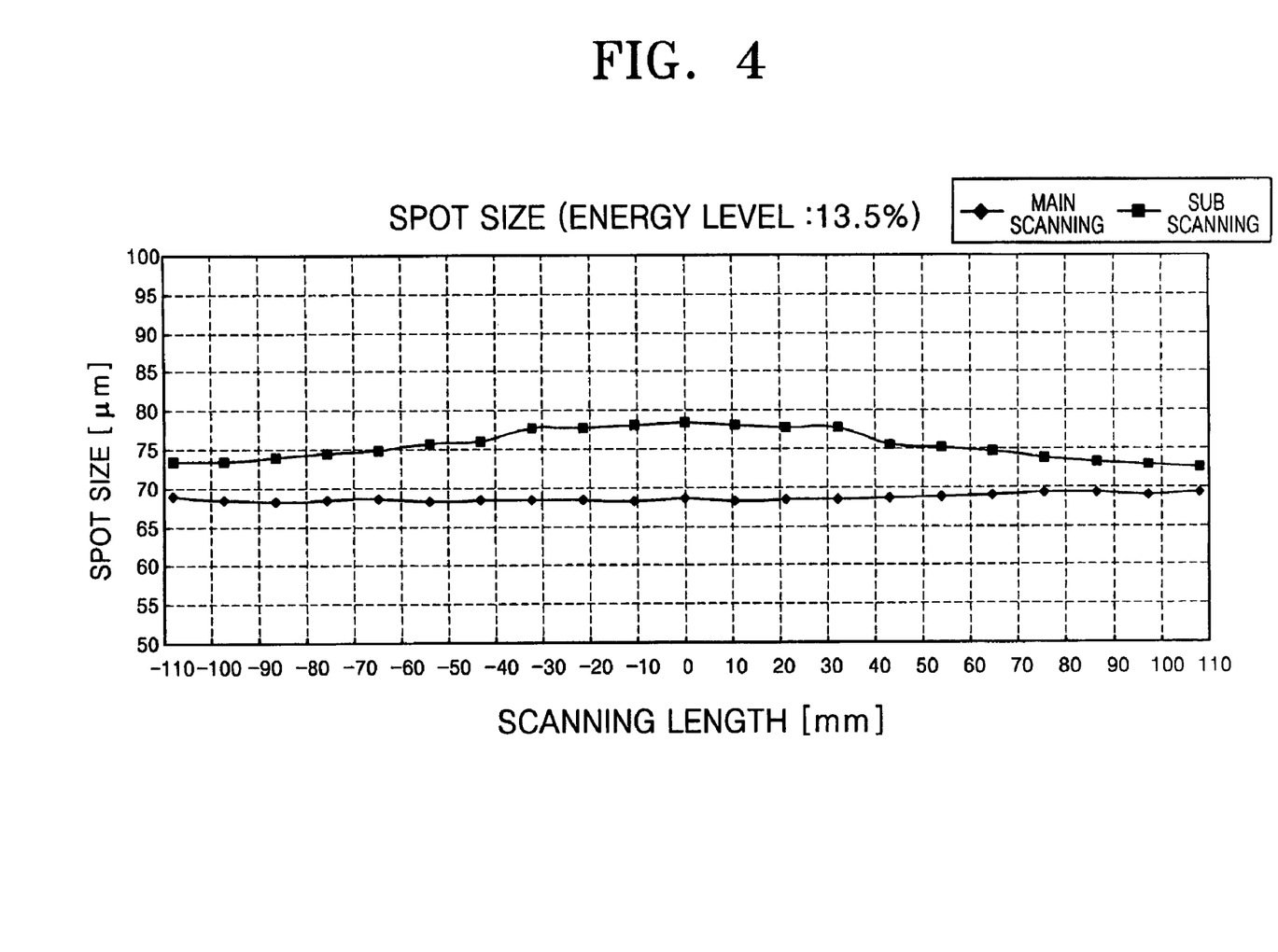
FIG. 4 is a graph showing a spot size with respect to a change in length of scanning performed by the optical scanning unit of FIG. 2.

FIG. 4 is a graph showing a spot size with respect to a change in length of scanning when the optical scanning unit is configured as shown in FIGS. 2 and 3. Here, the length of scanning refers to the length in main scanning direction when the position of a spot to which a beam passing through the center of the f-θ lens 41 is focused is set to zero. As is evident by FIG. 4, a constant beam spot size of less than 70 μm in main scanning direction is maintained across the entire length of scanning. Furthermore, a beam spot size in subscanning direction is greater than that in the main scanning direction but a difference between them is small. Thus, the optical scanning unit according to the illustrative embodiment is able to provide stable optical performance. The specification in Table 1 is only an example of the present embodiment, and various changes in optical components between the light source 21 and the reflecting surface of the rotating polygonal mirror 31 and arrangement thereof may be made.

FIG. 5 illustrates an optical scanning unit according to another embodiment of the present invention adopted for a color laser printer having a plurality of developing units 60a-60d, respectively. Referring to FIG. 5, the optical scanning unit according to this embodiment includes a light source module (not shown) that emits a plurality of beams, a beam deflector 30, an optical path changing unit that changes the propagation paths of the plurality of beams so that the beams are directed toward a plurality of exposed objects 50a-50d, respectively, respectively, and a plurality of f-θ lenses 41a-41d, respectively, disposed in the respective propagation paths of the beams deflected and scanned.

The light source module includes a plurality of light-emitting points, each of which produces and emits a beam. Similarly to the light source 21 described with reference to FIG. 2, the light source module is constructed of edge emitting laser diodes, VCSELs, or LEDs and emits four beams that undergo optical modulation independently. The construction of the light source module is well known in the art, so a detailed explanation thereof will not be given.

The optical scanning unit may include a collimating lens and first and second cylindrical lenses in an optical path between the light source module and the beam deflector 30. Since these optical components have substantially the same constructions as those in the embodiment previously described with references to FIGS. 2 and 3, a detailed explanation thereof will not be given.

The beam deflector 30 simultaneously deflects and scans the four incidents beams and includes a driving source 35 and a rotating polygonal mirror 31. The optical path changing unit changes the propagation paths of the four beams so that the beams are directed toward the exposed objects 50a-50d, respectively and includes a plurality of reflecting mirrors $M_{a1}$, $M_{a2}$, $M_{b1}$, $M_{b2}$, $M_{b3}$, $M_{c1}$, $M_{c2}$, $M_{c3}$, $M_{d1}$, and $M_{d2}$, respectively. Here, an optical path between the beam deflector 30 and each of the exposed objects 50a-50d has the same length. The length of the respective optical paths is equal to that in the optical scanning unit of FIG. 2 and satisfies the relationships specified in Inequalities (1) and (2).

Each of the plurality of f-θ lenses 41a-41d corrects the incident beam at different magnifications for main scanning direction and subscanning direction so that the corrected beam is focused on each of the exposed objects 50a-50d. Since the construction of each of the plurality of f-θ lenses 41a-41d is substantially identical to that of the f-θ lens 41, a detailed explanation thereof will not be given.

The optical scanning unit is constructed to include all optical components within a housing 70. Covers 45a-45d made of a transparent material, from which the beams transmitted through the f-θ lenses 41a-41d emerge, respectively, are disposed in the housing 70 and protect the internal components.

The optical scanning unit constructed above is able to provide a sufficient optical path length between the beam deflector and exposed object by setting the distance therebetween in such a way as to satisfy the requirements specified by Inequalities (1) and (2). Thus, the disclosed embodiments of the present invention allow flexibility in changing an optical path and ease of installation of an f-θ lens.

Furthermore, the f-θ lens is designed to have a low magnification of focusing in the subscanning direction, thereby minimizing an aspheric departure and thus facilitating mold design manufacture and injection processing. Furthermore, since there was a small difference between beam spot sizes in the main scanning direction and subscanning direction, the optical scanning unit of the disclosed embodiments of the present invention are able to provide a stable optical performance.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An optical scanning unit comprising:
    a light source which produces and emits a beam;
    a beam deflector which deflects and scans the beam in a main scanning direction of an exposed object; and
    an f-θ lens which corrects the beam deflected by the beam deflector at different magnifications for the main scanning direction than for a subscanning direction so that a corrected beam is focused onto the exposed object,
    wherein, when H is an entire length in the main scanning direction of the beam focused onto the exposed object and L is an axial distance between a reflection face of the beam deflector and the exposed object, the relationship of H and L satisfies an expression $$0.25 \leq \frac{H}{2 \cdot L} \leq 1.75.$$

2. The optical scanning unit of claim 1, wherein, when $L_1$ is an axial distance between the reflection face of the beam deflector and the entrance face of the f-θ lens and $L_2$ is an axial distance between the exit face of the f-θ lens and the exposed object, a relationship of $L_1$ and $L_2$ satisfies an expression $$0.5 \leq \frac{L_2}{L_1} \leq 1.5.$$

3. The optical scanning unit of claim 1, further comprising first and second cylindrical lenses which focus incident beams in the subscanning direction and the main scanning direction, respectively.

4. The optical scanning unit of claim 3, wherein the first cylindrical lens focuses a beam passing through an aperture stop in the subscanning direction onto the beam deflector, and the second cylindrical lens focuses the beam in main scanning direction.

5. The optical scanning unit of claim 3, wherein the second cylindrical lens decreases the distance between the light source and the beam deflector and also minimizes changes in an entire focal length of the optical scanning unit due to changes in temperature.

6. The optical scanning unit of claim 1, wherein a constant beam spot size of less than 70 μm in main scanning direction is maintained across the entire length of scanning.

7. The optical scanning unit of claim 6, wherein the f-θ lens is a plastic material.

8. The optical scanning unit of claim 1, wherein the f-θ lens has a low magnification in the subscanning direction, thereby minimizing an aspheric departure.

9. The optical scanning unit of claim 1, wherein the f-θ lens is constructed of a single aspheric lens having different radii of curvature in the main scanning direction and than in the subscanning direction.

10. An optical scanning unit comprising:
    a light source module which emits a plurality of beams, each of which is independently optically modulatable;
    an optical path changing unit which changes propagation paths of the plurality of beams so that a plurality of changed beams are directed toward a plurality of exposed objects, respectively; and
    a plurality of f-θ lenses which correct the plurality of changed beams and have traveled along different optical paths at different magnifications in the main scanning direction than in the subscanning direction so that corrected beams are focused onto the plurality of exposed objects,
    wherein, when H is an entire length in the main scanning direction of the beam focused onto the exposed object and L is an axial distance between a reflection face of the beam deflector and the exposed object, a relationship of H and L satisfies an expression $$0.25 \leq \frac{H}{2 \cdot L} \leq 1.75.$$

11. The optical scanning unit of claim 10, wherein, when $L_1$ is an axial distance between the reflection face of the beam deflector and the entrance face of the f-θ lens and $L_2$ is an axial distance between the exit face of the f-θ lens and the exposed object, a relationship of $L_1$ and $L_2$ satisfies an expression $$0.5 \leq \frac{L_2}{L_1} \leq 1.5.$$

12. The optical scanning unit of claim 11, wherein the light source module includes a plurality of light-emitting points, each of which produces and emits a beam.

13. The optical scanning unit of claim 10, wherein the optical path changing unit includes a plurality of reflecting mirrors, and each optical path has the same length.

14. The optical scanning unit of claim 10, wherein each of the plurality of f-θ lenses is constructed of a single aspheric lens having different radii of curvature in the main scanning direction than in the subscanning direction.

15. The optical scanning unit of claim 14, wherein each of the plurality of f-θ lenses is made of a plastic material.

16. A method of arranging optical components in an optical scanning device, comprising:
    providing a light source which emits a beam, a beam deflector which deflects the beam so that the beam scans in a main scanning direction of an exposed object; and an f-θ lens which corrects the beam deflected by the beam deflector so that a corrected beam is focused onto the exposed object, the correcting being at different magnifications for the main scanning direction than for the subscanning direction; and setting a distance between the beam deflector and the exposed object so that the following expression is satisfied $$0.25 \leq \frac{H}{2 \cdot L} \leq 1.75,$$

wherein, H is an entire length in the main scanning direction of the beam focused onto the exposed object and L is an axial distance between a reflection face of the beam deflector and the exposed object.

17. The method of claim 16, wherein, when $L_1$ is an axial distance between the reflection face of the beam deflector and an entrance face of the f-θ lens and $L_2$ is an axial distance between an exit face of the f-θ lens and the exposed object, a relationship of $L_1$ and $L_2$ satisfies an expression $$0.5 \leq \frac{L_2}{L_1} \leq 1.5.$$

18. The method of claim 16, wherein the f-θ lens has a low magnification in the subscanning direction, thereby minimizing an aspheric departure.

* * * * *